United States Patent [19]
Brass

[11] 3,982,670
[45] Sept. 28, 1976

[54] DISENGAGEABLE PLANTER SEED METER DRIVE

[75] Inventor: Ronald William Brass, Bettendorf, Iowa

[73] Assignee: Deere & Company, Moline, Ill.

[22] Filed: July 10, 1975

[21] Appl. No.: 594,775

[52] U.S. Cl. .............................. 222/177; 192/67 R; 192/99 A
[51] Int. Cl.² ........................ A01C 7/18; A01C 7/20
[58] Field of Search ........... 111/78; 192/67 R, 89 R, 192/89 B, 99 A, 99 S; 222/177, 178

[56] References Cited
UNITED STATES PATENTS

| | | |
|---|---|---|
| 2,563,186 | 8/1951 | Oehler et al. .................... 192/67 R |
| 2,658,396 | 11/1953 | Christiance ...................... 192/67 R |
| 2,757,770 | 8/1956 | Robertson ........................ 192/67 R |
| 2,762,225 | 9/1956 | Robertson ........................ 192/89 R |

Primary Examiner—Robert B. Reeves
Assistant Examiner—David A. Scherbel

[57] ABSTRACT

Individual seed meter drive shaft engagement mechanisms are provided for each seed meter to enable quick and simple coupling of the planter drive train to each seed meter. A slidable coupler mechanism is biased towards engagement and has locking assembly for securing the coupler in either a disengaged or engaged position. The mechanism is provided horizontal with the seed meter to enable simple seed meter removal for cleaning or changing of seed.

8 Claims, 7 Drawing Figures

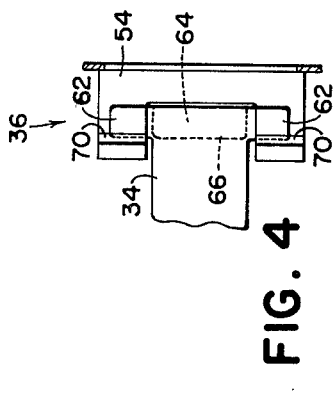
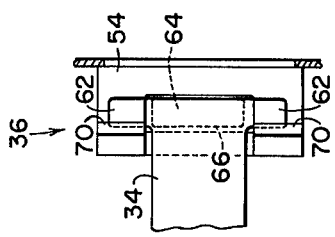
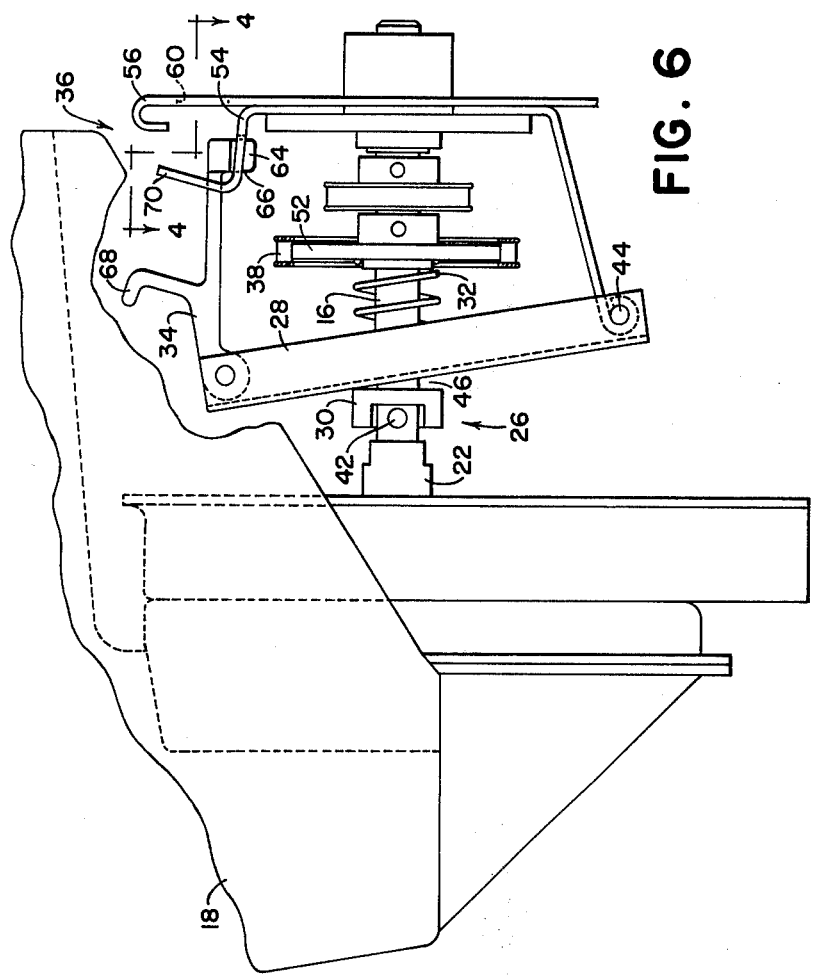
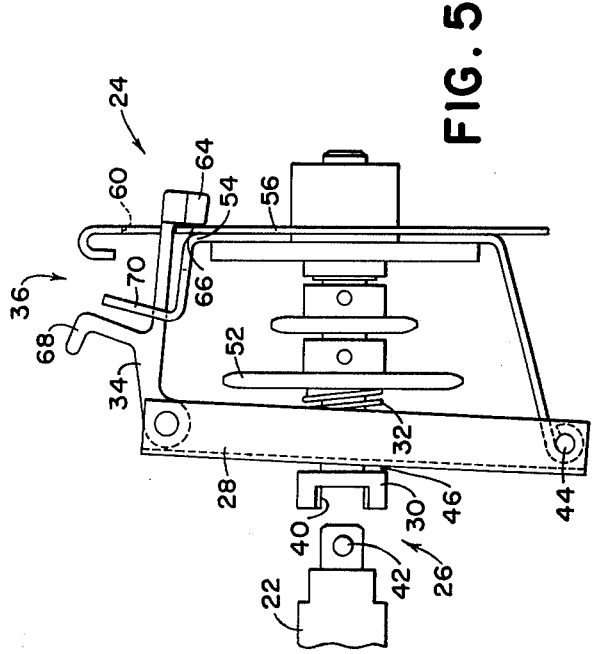
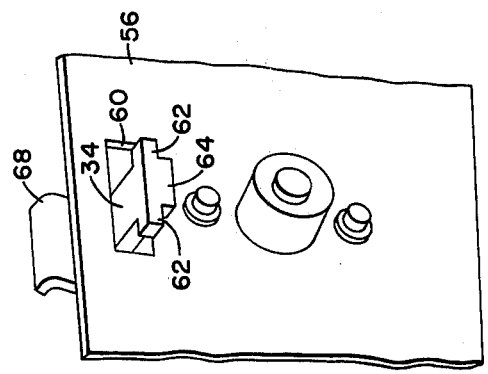

3,982,670

DISENGAGEABLE PLANTER SEED METER DRIVE

FIELD OF THE INVENTION

The present invention relates generally to agricultural planters and more particularly to mechanisms for engaging or disengaging a planter power drive shaft and its seed metering drive shaft.

DESCRIPTION OF THE PRIOR ART

Seed metering units on modern planters are generally fixed to the planter or attached in a manner whereby they are not simply and quickly removed. Plate-type planters, for example, are secured to the planter and driven by vertically positioned drive shafts. During planting operations, dirt, chaff, and other foreign matter may accumulate in the metering mechanism to create a clogged or damaged meter. To clear and clean a meter, the operator will be required to remove the meter. This is a time consuming task.

Removal of foreign matter from the seed meter or cleaning of seeds from the meter when changing seed varieties could more easily be accomplished if the seed meter could be simply removed and then replaced. Once removed the meter could then be turned upside down and the foreign matter or seeds shaken out.

SUMMARY OF THE INVENTION

The present invention provides a mechanism which permits quick and simple engagement of the planter power source with the seed meter drive shaft to allow easy removal and replacement of the seed meter.

The seed meter is attached to the seed hopper bottom and is thereby easily lifted and turned upside down to shake out accumulated foreign matter. The seed meter drive shaft is positioned horizontally to accomodate a simple drive engagement mechanism. The seed drive engagement mechanism includes a coupling means which can be simply and manually engaged to connect the power shaft with the seed metering shaft. A biasing means acts to hold the coupling means in the engaged position and a locking means provides ability to secure the coupling means in the uncoupled position.

BRIEF DESCRIPTION OF THE DRAWINGS

FIG. 3 is a perspective view of the frame wall and arm lug illustrating their relative positions when the coupler means is disengaged.

FIG. 4 is an enlarged top view of the locking arm positioned in the offset structure to hold the coupler means in an engaged position.

FIG. 5 is a side view of the mechanism illustrating the relative positions of the parts when the coupler means is disengaged.

FIG. 6 is a side view of the mechanism illustrating the relative positions of the parts when the coupler means is engaged.

FIG. 7 is a top view of the alternate locking arm positioned in the offset structure which has an opening wherein the lug is seated.

DESCRIPTION OF THE PREFERRED EMBODIMENT

Figure 2:
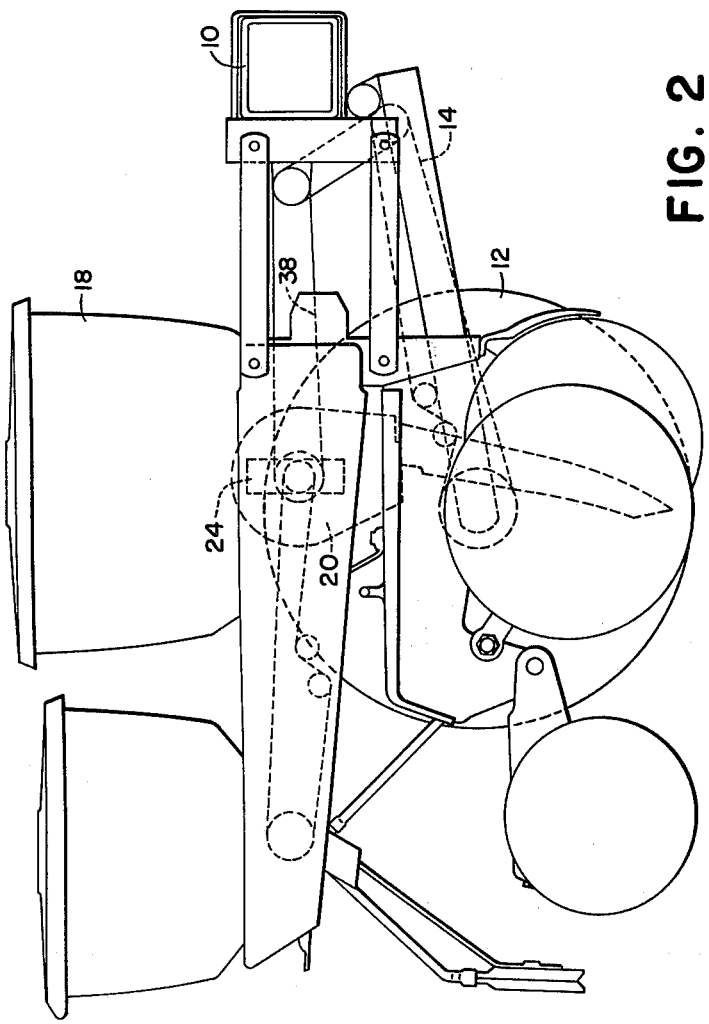
FIG. 2 is a side view illustrating the mechanism in its relation to the planter

The current ebodiment of the seed meter drive engagement mechanism is illustrated in FIG. 2 in combination with a planter assembly having a mobile frame 10 with ground-engaging drive wheels 12, a drive train 14 extending between the wheels and power shaft 16, a seed hopper 18 supported on the frame 10, a seed selecting and dispensing means 20 to transfer the seed from the selecting means to a furrow, and a seed meter drive shaft 22 axially aligned with the power shaft 16. Referring now to the drawings, the improved seed meter drive engagement mechanism is designated generally by the number 24. The mechanism 24 includes a sliding coupler means 26 for coupling the power shaft 16 and seed meter drive shaft 22, a control lever 28 connected with the coupler means 26 to shiftably move the sleeve 30 into and out of engagement with the seed meter drive shaft 22, a biasing means or spring 32 to bias the sleeve 30 towards the seed meter drive shaft 22 and into an engaged position, an arm 34 connected with the lever 28 for shifting the lever 28 between disengaged first and engaged second positions, and a latch or locking means 36 to lock the sliding coupler means 26 in a disengaged position as illustrated in FIG. 3. An alternate embodiment provides for locking the coupler means in either an engaged or disengaged position.

Referring now to FIG. 2, it can be seen that the power shaft 16 is driven by the chain 38, the chain 38 is driven by the drive train 14, and the drive train 14 is drivingly connected to the planter assembly's ground-engaging drive wheels 12. The power shaft 16 is positioned coaxial with the seed meter drive shaft 22. While many conventional seed meter drive arrangements provide a vertically positioned meter drive, applicant has found that the horizontally oriented drive provides a more simple and effective arrangement for engaging or disengaging the seed meter drive shaft than does the vertically positioned power drive.

The sliding coupler means 26 is provided to engagably couple the power shaft 16 with the seed meter drive shaft 22. As can be seen in FIGS. 5 and 6, the coupler means 26 includes a cylindrical sleeve 30 coaxial with and slidably mounted on the power shaft 16 at its one end. The sleeve 30 is driven by the power shaft 16 and is also free to be slidably shifted along the shaft 16. The means between the sleeve 30 and seed drive shaft 22 for releasably securing the seed drive shaft with the sleeve include at the sleeve's outer end a slotted opening 40 for matingly engaging the radially mounted pin 42 secured to the seed meter drive shaft 22. When the sleeve 30 is shifted towards engagement with the seed meter drive shaft pin 42 by the control lever 28, the pin 42 seats within the slotted opening 40. The U-shaped control lever 28 is pivotally secured to the frame at 44, and is transversely positioned relative to the power shaft 16 to permit back and forth movement of the lever. The sleeve 30 is journaled circumferencially at its middle portion 46 and fin projections 48 on opposite sides of the lever opening 50 seat therein to provide a connection between the lever 28 and sleeve 30 that permits the lever to shift the sleeve 30.

The biasing means or coil spring 32 coaxially surrounds the power shaft 16, abutting on one end the drive chain sprocket 52 which is secured to the power shaft, and on the other end the control lever 28 surface.

Under constant compression, the spring 32 acts to exert on the control lever 28 a force for holding the sleeve 30 in the engaged position. The alternate embodiment for locking the sleeve in either the disengaged or engaged position will first be discussed.

Acting between the frame 10 and control lever 28 is the locking means 36 for the sleeve 30 in either a first disengaged or second engaged position (see FIGS. 3 and 7). This locking means 36 includes that part of the arm 34 having at least one lug, offset structure 54 from the wall 56 having an opening 58 wherein the lug can be positioned, and an opening 60 in the wall 56 of the frame 10 through which the arm 34 can be shiftably positioned. The arm 34 is pivotally attached at its one end to the upper end of the control lever 28. At its other end the arm 34 is T-shaped and includes lugs 62 and 64 extending respectively horizontally from the arm and downwardly from the arm.

The means for locking the coupler means 26 in a first disengaged position is the same for both embodiments. The arm 34 is first shifted through the opening 60 in the wall 56 as shown in FIG. 3. The biasing spring 32 will then bias the lever 28 towards engagement and thereby acts to hold the edge surface 66 of the downwardly extending lug 64 against the edge of the opening 60 in the wall 56. To engage the coupler means 26, the operator will lift on the handle 68 to permit the lugs 62 and 64 on the arm 34 to shift through the wall opening 60. In the alternate embodiment, the downwardly extending lug 64 will then be positioned in the opening 58 of the offset structure 54 to lock the coupler means 26 in the engaged position. The weight of the arm 34 aids in retaining the lug 64 within the opening 58 and back and forth movement of the arm 34 and coupler means 26 during operation is prevented by the downwardly lug surfaces 66 abutting the opening 58 edge surfaces. The horizontally extending lugs 62 abut the upwardly extending stop surfaces 70 to position the lug 64 for ease of locking in either opening 58 or 60.

The other means for locking the arm and coupler in the disengaged position does not provide for locking the arm or coupler in the engaged position. No opening 58 is required, and the edges of the lug 62 simply abut the stop surfaces 70 on the offset structure as the spring 32 holds the coupler in the engaged position. In this manner movement of the coupler is limited in the one direction by the force of the spring and in the other direction by the edges of lugs 62 abutting the stop surfaces 70.

The handle 68 is shaped for simple finger grasping to easily move the arm 34 and lever 28 back and forth. As the lever 28 is moved by the handle 68, it in turn slidably shifts the sleeve 30 along the power shaft 16 until the sleeve 30 end abuts the seed meter drive shaft 22. While the slot 40 may not engage the pin 42 immediately, engagement will result as the power shaft 16 begins to turn and the spring 32 acts to force the sleeve 30 towards the seed meter drive shaft 22.

Figure 1:
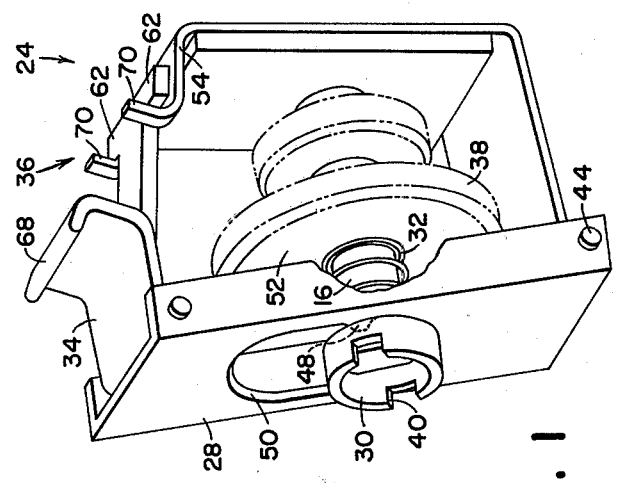
FIG. 1 is a side perspective view of the mechanism for engaging and disengaging the power shaft and seed drive shaft.

To disengage the seed meter drive shaft 22 from the power shaft 16, as for example when seed is to be changed, the seed meters to be cleaned, or substantially all of the field but a few rows is planted and not all planters are required to complete the field, the operator merely lifts on the handle 68 and if using a locking means having the alternative embodiment, lifts the lug 64 out of the opening 58. In either embodiment, he then shifts the arm 34 from the position illustrated in FIGS. 1 and 6 to that position illustrated in FIGS. 3 and 5. When the operator again continues to plant, the power shaft 16 of the disengaged planter then will continue to rotate as the planter advances over the field, but the seed metering drive shaft 22 will not be driven.

Applicant's seed meter drive engagement mechanism provides a quick and dependable means to engage or disengage each individual planter unit while at the same time assuring that each unit engagement mechanism will remain in the position initially set. With this mechanism, operators can easily change seed, clean meters or seed hoppers, or discontinue planting with selected planter units.

I claim:

1. On a planter assembly, a mobile frame having groundengaging drive wheels; a power shaft; a drive train extending between the wheels and power shaft for driving the latter; a seed hopper supported on the frame; a seed selecting and dispensing means, including a seed delivery means for transferring said seed from the selected means to a furrow, and including a seed meter drive shaft therefore axially aligned with the power shaft, the improvement comprising: a sliding coupler means between the power shaft and seed meter drive shaft for engagably coupling said shafts; biasing means for biasing the coupler means towards an engaged position; a control lever connected to and shiftable with the coupler means and pivotally mounted at one end on the frame; a wall supported on the frame in offset but facing relation to the lever and having a first opening therein; structure offset from the wall and rigid therewith and having a second opening therein; an arm pivotally carried on the lever and shiftable through the first and second openings and having a lug thereon for selectively engaging the edges of the respective openings for locking said coupler means in its disengaged or engaged positions respectively.

2. The invention defined in claim 1 wherein the sliding coupler means includes a cylindrical sleeve coaxial with and slidably carried on the power shaft; and means between the sleeve and meter drive shaft for releasably securing the meter drive shaft with the sleeve as the sleeve is slidably moved towards the meter drive shaft.

3. The invention defined in claim 2 wherein the means for releasably securing the sleeve with the meter drive shaft includes a radially extending pin affixed to the end of the meter drive shaft for being receivably seated in a slotted opening which extends across the adjacent end of the slidable sleeve.

4. The invention defined in claim 1 wherein the biasing means includes a coil spring coaxial with the power shaft and acting between the control lever and power shaft.

5. The invention defined in claim 1 wherein the control lever is positioned perpendicular to said power shaft, pivotally mounted at its one end with the frame for back and fourth movement along the axis of said power shaft, and said coupler means is connected with the lever for shiftable movement therewith.

6. The invention defined in claim 1 in which the arm lug extends from the arm and when locking the sliding coupler in a disengaged first position is shiftably positioned through the wall opening whereat the lug edge abuts the wall.

7. The invention defined in claim 1 in which the arm lug extends from the arm and when locking the sliding coupler in an engaged second position is receivably seated in the second opening whereat the lug edge abuts said offset structure.

8. On a planter assembly having a mobile frame having ground-engaging drive wheels; a power shaft; a drive train extending between the wheels and power shaft for driving the latter; a seed hopper supported on the frame; a seed selecting and dispensing means, including a seed delivery means for transferring said seed from the selecting means to a furrow and including a seed meter drive shaft therefore axially aligned with the power shaft; the improvement comprising: a cylindrical sleeve coaxial with and slidably engaging the power shaft, having a slotted opening in its one end wherein a radially extending pin affixed to the end of the meter drive shaft is receivably positioned to engageably couple the power shaft with the meter drive shaft when the sleeve is slidably moved toward the meter drive shaft; a lever transverse to said power shaft, pivotally mounted at its one end with the frame for back and forth movement along the axis of the power shaft, and connected to and shiftable with the cylindrical sleeve; a coil spring coaxial with and surrounding one portion of the power shaft, fixed on its one end and compressibly acting at its other end against the lever; an L-shaped member secured to the frame, having one leg in offset but facing relation to the lever member and the other leg rigid with the frame, said offset leg having an upwardly opening slot and said other leg having an opening therein; an arm pivotally carried on the lever, receivable in the upwardly opening slot and shiftable through said slot in said other leg, said arm having lugs thereon for engaging the legs at the edges of the slot and opening respectively when said sleeve is in its engaged and disengaged position respectively.

\* \* \* \* \*

UNITED STATES PATENT OFFICE
CERTIFICATE OF CORRECTION

Patent No. 3,982,670          Dated 28 September 1976

Inventor(s) Ronald William Brass

It is certified that error appears in the above-identified patent and that said Letters Patent are hereby corrected as shown below:

Column 4, line 20, change "selected" to --selecting--.

Signed and Sealed this

Twenty-sixth Day of April 1977

[SEAL]

Attest:

RUTH C. MASON
Attesting Officer

C. MARSHALL DANN
Commissioner of Patents and Trademarks